(12) United States Patent
Freitag et al.

(10) Patent No.: US 10,666,050 B2
(45) Date of Patent: May 26, 2020

(54) INTERFACE ARCHITECTURE, CABIN MONUMENT AND METHOD FOR LINKING A CABIN MONUMENT IN AN AIRCRAFT

(71) Applicant: AIRBUS OPERATIONS GMBH, Hamburg (DE)

(72) Inventors: Klaus-Udo Freitag, Hamburg (DE); Yener Palit, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 103 days.

(21) Appl. No.: 15/939,567

(22) Filed: Mar. 29, 2018

(65) Prior Publication Data
US 2018/0287383 A1 Oct. 4, 2018

(30) Foreign Application Priority Data
Mar. 31, 2017 (DE) .......................... 10 2017 205 535

(51) Int. Cl.
*H02J 3/14* (2006.01)
*H02J 1/14* (2006.01)
(Continued)

(52) U.S. Cl.
CPC ................ *H02J 3/14* (2013.01); *B64G 1/428* (2013.01); *G06F 1/263* (2013.01); *G06F 1/3234* (2013.01); *H02J 1/14* (2013.01)

(58) Field of Classification Search
CPC . H02J 3/14; B64G 1/428; G06F 1/263; G06F 1/3234
See application file for complete search history.

(56) References Cited

U.S. PATENT DOCUMENTS 10,222,766 B2 * 3/2019 Fagan ................... G05B 15/02
2003/0208764 A1 * 11/2003 Galipeau ............ H04N 7/17318
725/76
(Continued)

FOREIGN PATENT DOCUMENTS

DE  699 14 617 T2  11/2004
DE  10 2008 055 811 A1  5/2010
(Continued)

OTHER PUBLICATIONS

German Search Report for Application No. 102017205535 dated Mar. 31, 2017.

*Primary Examiner* — Carlos Amaya
(74) *Attorney, Agent, or Firm* — Jenkins, Wilson, Taylor & Hunt, P.A.

(57) ABSTRACT

An interface architecture for a cabin monument has an energy supply interface module; a data interface module; a first energy input connection coupled to a first input of the energy supply interface module, which connection is designed or configured to be connected to an external energy supply; a first data input connection coupled to the data interface module, which connection is designed or configured to obtain data from an external data source and forward the data to the data interface module; a first energy output connection coupled to a first output of the energy supply interface module, which connection is designed or configured to deliver electrical energy to a load that can be connected to the energy output connection; and a communication interface which couples the energy supply interface module to the data interface module.

11 Claims, 1 Drawing Sheet

(51) Int. Cl.
  *B64G 1/42*   (2006.01)
  *G06F 1/26*   (2006.01)
  *G06F 1/3234*   (2019.01)

(56) References Cited

U.S. PATENT DOCUMENTS

2005/0121978 A1   6/2005   McAvoy
2016/0306417 A1   10/2016  Greig et al.
2017/0063151 A1   3/2017   Freitag et al.
2017/0101067 A1*  4/2017   Carleial ................ B60R 16/023

FOREIGN PATENT DOCUMENTS

DE   10 2011 088 068 B3   4/2013
EP            2512920 A1   10/2012

* cited by examiner

INTERFACE ARCHITECTURE, CABIN MONUMENT AND METHOD FOR LINKING A CABIN MONUMENT IN AN AIRCRAFT

CROSS-REFERENCE TO RELATED APPLICATION

This application claims priority to German patent application DE 10 2017 205 535.9 filed Mar. 31, 2017, the entire disclosure of which is incorporated by reference herein.

TECHNICAL FIELD

The disclosure herein relates to an interface architecture, in particular for cabin monuments on board an aircraft, to a cabin monument having an interface architecture of this type, in particular a sanitary module monument, to an aircraft having a cabin monument of this type, and to a method for linking a cabin monument, in particular a sanitary module monument, in an aircraft.

BACKGROUND

Every newly built aircraft is tailored in large part to the buyer's requirements. As a result, on account of the high number of individual modules and components, there is a wide variety of possible combinations, which means individual planning is often essential in the design phase.

However, as a consequence thereof, many components are often planned separately from other components, and are fitted with their own modes of linking to the central aircraft elements, such as power supply, data transmission and the like. This means that many different types of lines, cables and interfaces have to be aligned and adapted to one another in an aircraft, which means that collective component measures, such as a decentralised load-shedding strategy, risk-based load prioritisation or synchronised data transmission are only accomplished with difficulty.

EP 2 512 920 A1 discloses a supply module for a passenger transport vehicle having a first supply unit for supplying passengers with a first supply medium in a first supply region, a second supply unit for supplying passengers with a second supply medium in a second supply region, and a control unit which is designed or configured to activate the first supply unit in a first sub-region of the first supply region and to activate the second supply unit in a second sub-region of the second supply region. US 2005/0121978 A1 discloses methods and systems for supplying energy to a galley monument on board an aircraft. DE 10 2011 088 068 B3 discloses an interface device for cabin monuments of an aircraft.

SUMMARY

One of the ideas of the disclosure herein is therefore to find improved solutions for linking cabin monuments on board an aircraft to the central supply interfaces of the aircraft.

According to a first aspect of the disclosure herein, an interface architecture, in particular an interface architecture for cabin monuments, comprises an energy supply interface module; a data interface module; a first energy input connection coupled to a first input of the energy supply interface module, which connection is designed or configured to be connected to an external energy supply; a first data input connection coupled to the data interface module, which connection is designed or configured to obtain data from an external data source and forward the data to the data interface module; a first energy output connection coupled to a first output of the energy supply interface module, which connection is designed or configured to deliver electrical energy to a load that can be connected to the energy output connection; and a communication interface which couples the energy supply interface module to the data interface module.

According to a second aspect of the disclosure herein, a cabin monument, in particular for use on board an aircraft, comprises an interface architecture according to the first aspect of the disclosure herein.

According to a third aspect of the disclosure herein, an aircraft comprises at least one cabin monument according to the second aspect of the disclosure herein.

According to a fourth aspect of the disclosure herein, a method for linking a cabin monument in an aircraft, in particular a cabin monument according to the second aspect of the disclosure herein in an aircraft according to the third aspect of the disclosure herein, comprises the steps of connecting an external energy supply to a first energy input connection that is coupled to a first input of an energy supply interface module of an interface architecture; connecting an external data source to a first data input connection that is coupled to a data interface module of the interface architecture; connecting an electrical load to a first energy output connection of the interface architecture, which connection is coupled to a first output of the energy supply interface module; and coupling the energy supply interface module to the data interface module via a communication interface of the interface architecture.

A concept of the disclosure herein includes creating an intelligent, replaceable, modular and programmable system for linking aircraft component parts such as cabin monuments to a cabin environment. The flexible design of input and output interfaces creates free spaces in the supply line design, which spaces allow the number of separate connections required to be reduced. In particular, the number of energy supply adapters and data adapters required can be greatly reduced. As a consequence thereof, the amount of wiring required and thus advantageously the system weight of the cabin monument construction also decrease.

Installation is simple, fast and space-saving, meaning that greater operating reliability can be achieved at reduced maintenance and fitting costs. Problem-solving strategies in terms of rectifying operation problems can also be optimised by virtue of the documentation requirements being simplified. The individual interface architectures can each be adapted and specifically tailored to the needs of the customers. Furthermore, electrical interfaces can be made to conform with existing standards. Design alterations can be carried out without particular outlay in terms of documentation and independently of alterations to the cabin architecture or internal monument architecture. The type of cabin monument linked can be varied in a flexible manner, which allows all types of module, regardless of the load-carrying capacity or safety requirements thereof, to be adapted to the cabin environment.

According to some embodiments of the interface architecture according to the disclosure herein, the interface architecture can be implemented as a flexible printed circuit board. This makes a very low weight possible, which can be particularly advantageous for avionics applications in particular. Furthermore, flexible printed circuit boards can be made to be very thin and to be housed in robust, flame-resistant, flexible and/or transparent housing materials, such as a resin or a plastics material.

An interface architecture in the form of a flexible printed circuit board can be secured by flexible adhesive tape or a suitable adhesive support to component parts, for example to a cabin monument, safely and without difficulties in installation. Moreover, modular concepts can be implemented without prior, increased design outlay. Modular concepts of this type additionally reduce outlay for repairs, optimise electrical interface functionality, allow key technologies for a decentralised energy supply, automate interface allocations and optimise the efficiency potential of the interface architecture in a decisive manner.

According to some other embodiments of the interface architecture according to the disclosure herein, the interface architecture can furthermore comprise a circuit module, which is coupled between the first output of the energy supply interface module and the first energy output connection. The circuit module allows individual and separately controllable switching of loads, for example for a flexible approach to load shedding. The circuit module allows further electrical parameters, such as current consumption, voltage or ground faults to be detected in a simple, efficient and safe manner. If the circuit module is designed or configured to be replaceable, it can be advantageous to adapt the interface architecture to the particular requirements of the cabin monument in a flexible manner.

According to some other embodiments of the interface architecture according to the disclosure herein, the data interface module can be designed or configured to control the circuit module. As a result, parameters that are dependent on the operating state can be set which can advantageously prevent an inadmissible or safety-critical switching status being assumed. Data bus interferences can also be advantageously avoided by controlling the circuit module via the data interface module. Switch matrix configurations can be updated by coding signals while in operation, even during a load situation. For this purpose, control can be carried out in the data interface module, for example via a dedicated programmable logic device or a dedicated application-specific integrated circuit. As a result, operational safety is advantageously improved and unintentional or incorrect switching of the energy supply can be effectively prevented.

According to some other embodiments of the interface architecture according to the disclosure herein, the interface architecture can further have a second energy input connection coupled to a second input of the energy supply interface module, which connection is designed or configured to be connected to an external energy supply. Various energy supply adapters can be connected on account of the multiplicity of connections of the same or of different type. This allows the physical separation of energy supply connections of varying priority, such as a constantly energised energy supply connection ("hot battery"), an essential energy supply connection, a non-essential energy supply connection, a safety-critical energy supply connection, a non-safety-critical energy supply connection, etc.

According to some other embodiments of the interface architecture according to the disclosure herein, the interface architecture can further have a second energy output connection coupled to a second output of the energy supply interface module, which connection is designed or configured to deliver electrical energy to a load that can be connected to the second energy output connection. As a result, different components of a cabin monument can be linked to various load and priority requirements by the same interface architecture. For example, the second output can be used as a redundant energy supply output. Furthermore, various voltage levels or various voltage types (DC voltage, AC voltage) can be also be delivered via the various outputs of the energy supply interface module.

According to some other embodiments of the interface architecture according to the disclosure herein, the interface architecture can furthermore have a wireless communication interface comprised in the data interface module. As a result, data can advantageously be transmitted to the data interface module in a wireless manner.

According to some other embodiments of the interface architecture according to the disclosure herein, the interface architecture furthermore has a display and/or user interaction module which is coupled to the data interface module. This allows a user to retrieve information about the operating state of the interface architecture, and optionally to input control commands and/or configuration data into the data interface module via the user interaction module.

According to some other embodiments of the interface architecture according to the disclosure herein, the data interface module can be designed or configured to control data communication via power lines of the energy supply interface module. Data communication via power lines ("data-over-power", DOP) can help to save on data lines by communication between the aircraft systems and a cabin monument connected to the interface architecture running via the same line as the energy supply.

The above-mentioned embodiments and developments can be combined as desired in any meaningful manner. Further possible embodiments, developments and implementations of the disclosure herein include combinations of features of the disclosure herein described previously or below with respect to the embodiments, even if not explicitly specified. In particular, a person skilled in the art will also add individual aspects as improvements or supplements to the relevant basic form of the present disclosure.

BRIEF DESCRIPTION OF THE DRAWINGS

The present disclosure will be described in greater detail below with reference to the embodiments shown in the schematic and example drawings, in which.

Figure 1:
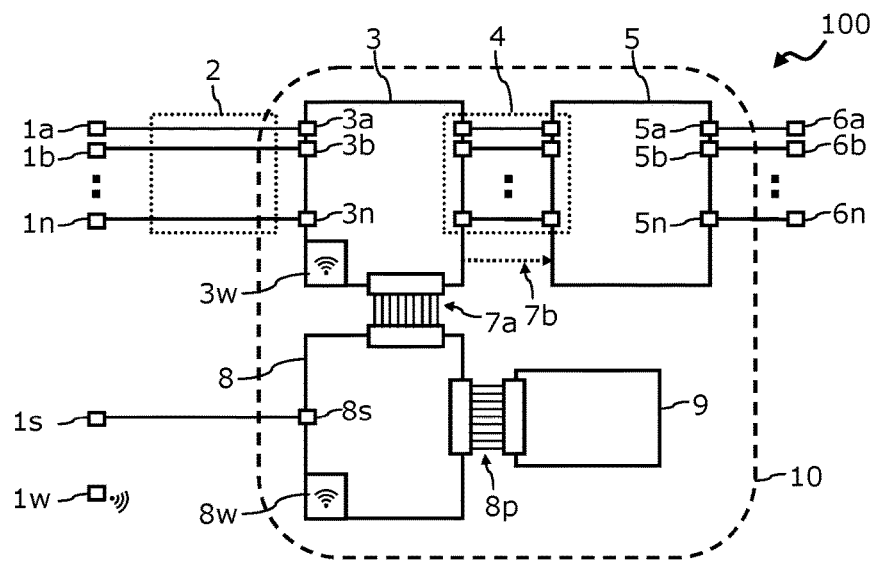
FIG. 1 is a schematic block diagram of an interface architecture for a cabin monument according to one embodiment of the disclosure herein.

The accompanying drawings are intended to facilitate further understanding of the embodiments of the disclosure herein. The drawings show embodiments and, together with the description, are used to explain principles and concepts of the disclosure herein. Other embodiments and many of the advantages mentioned can be found with reference to the drawings. The elements of the drawings are not necessarily shown to scale relative to one another. Terms specifying direction, such as "upper", "lower", "left", "right", "above", "below", "horizontal", "vertical", "front", "rear" and similar details are used merely for explanatory purposes and are not intended to restrict the generality to specific embodiments as shown in the drawings.

In the figures of the drawings, identical, functionally identical and identically operating elements, features and components are in each case provided with the same reference signs, unless indicated otherwise.

DETAILED DESCRIPTION

Cabin monuments within the meaning of the present disclosure include all built-in elements in aircraft passenger cabins that are provided for supplying the passengers and/or to be used by the passengers. Built-in elements of this type in an aircraft passenger cabin, such as toilets or galleys, are also referred to as monuments and are supplied at the corresponding installation position with water, air or the like via the supply lines present in the aircraft, or waste or waste water is removed via disposal lines. For example, individual system lines exist, as required, for vacuum, waste water, auxiliary cooling or drinking water. The functions of the cabin monuments are supplied to the monuments via different electrical and/or power supply lines.

FIG. 1 shows an interface architecture 100. The interface architecture 100 can be used for cabin monuments, so that a cabin monument 200, as shown schematically in FIG. 3 for example, can be electrically connected to central aircraft components in an aircraft. In this case, an aircraft A, as shown in FIG. 4 for example, can have one or a plurality of cabin monuments 200 of this type, some or all of which can be linked to the aircraft A by an interface architecture 100 from FIG. 1. Of course, the interface architecture 100 can also be used and adapted for other suitable modules in an aircraft A.

The interface architecture 100 comprises an energy supply interface module 3 and a data interface module 8 that is coupled via a communication interface 7a to the energy supply interface module 3. The energy supply interface module 3 has energy input connections 3a to 3n, which can be coupled to one of a plurality of external energy supply sources 1a to 1n, respectively. The number of energy input connections 3a to 3n can be more than one and can in particular be determined in a flexible manner in accordance with design specifications and the intended use of the interface architecture.

The external energy supply sources 1a to 1n can be, for example, different energy sources of an aircraft, such as batteries, accumulators, generators, fuel cells and the like. The energy sources can comprise, for example, essential energy supply sources, non-essential energy supply sources, permanently energised energy supply lines, non-permanently energised energy supply lines and redundant energy supply connections.

Furthermore, the energy supply interface module 8 can have a wireless communication module 3w, by which wireless communication with a processor (not explicitly shown) or control module of the energy supply interface module 8 can be handled.

The energy supply interface module 3 is coupled at a first output to a circuit module 5 via an internal interface 4, which circuit module is in turn coupled between the first output of the energy supply interface module 3 and one or a plurality of first energy output connections 5a to 5n. The energy output connections 5a to 5n can be coupled to one of a plurality of loads 6a to 6n, respectively, which loads are for example different components of a cabin monument. The cabin monument can be, for example, an in-built sanitary module in a passenger cabin of an aircraft, and the components can in this case comprise, for example, a toilet, lighting, sensors and the like.

The data interface module 8 can communicate control commands to the circuit module 5, via an internal connection 7b between the energy supply interface module 3 and the circuit module 5, in order to control functions thereof. The data interface module 8 itself can be coupled to an optional display and/or user interaction module 9 via an external interface 8p. For example, the display and/or user interaction module 9 can have an input(s) and a display, by which a user can obtain control access to the data interface module 8 and information relating to operating states of the data interface module 8.

The data interface module 8 has a data input connection 8s, which can be coupled to an external data source 1s, for example a data bus of the aircraft. Data can be forwarded via the data input connection 8s from an external data source to the data interface module 8 for processing. Furthermore, the data interface module 8 can be provided with an optional wireless communication interface 8w, by which wireless data communication with an external wireless communication component 1w, for example a wireless network of an aircraft, can be handled.

Figure 2:
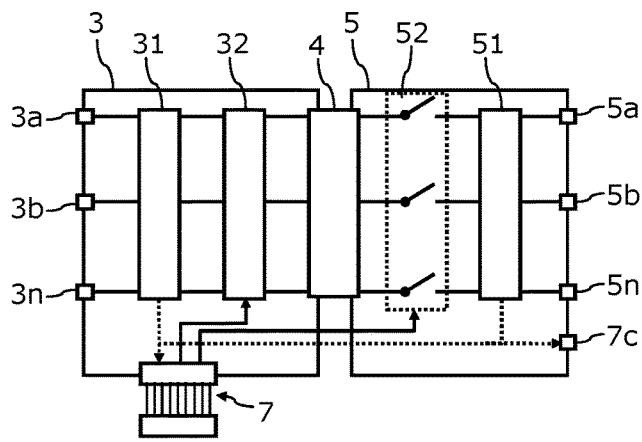
FIG. 2 is a schematic detailed view of the interface architecture shown in FIG. 1 for a cabin monument.

As explained in greater detail in conjunction with FIG. 2, the energy supply interface module 3 is used to provide electrical energy to loads 6a to 6n which are connected to the circuit module 5. For this purpose, the energy supply interface module 3 can be provided with a safety module 31, which is coupled, in series with a data injector 32, between the inputs 3a to 3n and the internal interface 4. The data injector 32 is controlled via the data interface module 8 and is used for controlling data communication via power lines of the energy supply interface module 3.

The circuit module 5 can have switches 52 for selectively activating or deactivating separate power lines through the circuit module 5. The switches 52 can in this case be controlled by the data interface module 8 in order to implement a programmable load-shedding strategy. A further safety module 51 can be implemented downstream of the switches 52, which module is provided, for example, with a current level monitor on each power line through the circuit module 5.

Figure 3:
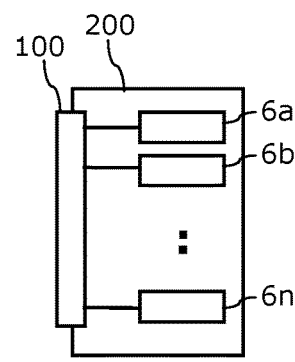
FIG. 3 is an exemplary illustration of a cabin monument according to a further embodiment of the disclosure herein.
Figure 4:
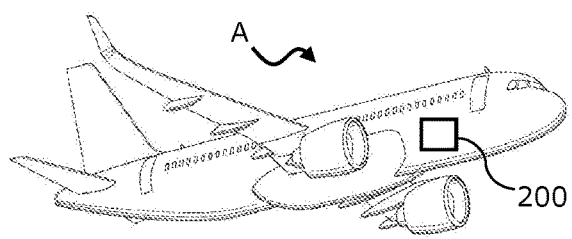
FIG. 4 is an exemplary illustration of an aircraft having a cabin monument according to a further embodiment of the disclosure herein.
Figure 5:
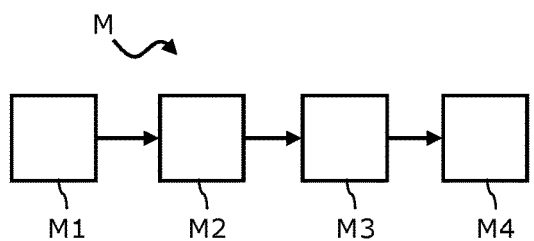
FIG. 5 is a schematic illustration of steps of a method for linking a cabin monument in an aircraft according to a further embodiment of the disclosure herein.

FIG. 5 schematically shows a method M for linking a cabin monument, for example the cabin monument 200 in FIG. 3, by an interface architecture, for example the interface architecture 100 as has been explained in conjunction with FIGS. 1 and 2, in an aircraft, for example in the aircraft A from FIG. 4.

The method M initially comprises, in a first step M1, connecting an external energy supply to a first energy input connection that is coupled to a first input of an energy supply interface module 3 of the interface architecture 100. Subsequently, in a step M2, an external data source 1s is connected to a first data input connection 8s that is coupled to a data interface module 8 of the interface architecture 100.

In a step M3, an electrical load, for example a component 6a to 6n of the cabin monument 200, is connected to a first energy output connection of the interface architecture 100, which connection is coupled to a first output of the energy supply interface module 3. Finally, in a step M4, the energy supply interface module 3 is coupled to the data interface module 8 via a communication interface 7a of the interface architecture 100.

In the detailed description above, various features have been summarised in one or more examples so as to provide a more cogent representation. However, it should be clear here that the above description is of a purely illustrative, but in no way limiting nature. The description covers all alternatives, modifications and equivalents of the various features and embodiments. Many other examples will become immediately clear to a person skilled in the art owing to their expert knowledge in view of the above description.

The embodiments have been selected and described in order to be able to show, as clearly as possible, the principles on which the disclosure herein is based and the possible applications thereof in practice. As a result, persons skilled in the art can optimally modify and use the disclosure herein and the various embodiments thereof with respect to the intended purpose thereof. In the claims and the description, the terms "containing" and "having" are used as linguistically neutral terminology for the corresponding term "comprising".

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interface architecture, comprising:
an energy supply interface module;
a data interface module;
a first energy input connection coupled to a first input of the energy supply interface module, which connection is configured to be connected to an external energy supply;
a first data input connection coupled to the data interface module, which connection is configured to obtain data from an external data source and forward the data to the data interface module;
a first energy output connection coupled to a first output of the energy supply interface module, which connection is configured to deliver electrical energy to a load that can be connected to the first energy output connection;
a communication interface, which couples the energy supply interface module to the data interface module; and
a circuit module, which is separate from the energy supply interface module and coupled between the first output of the energy supply interface module and the first energy output connection.

2. The interface architecture of claim 1, wherein the interface architecture is a flexible printed circuit board.

3. The interface architecture of claim 1, wherein the data interface module is configured to control the circuit module.

4. The interface architecture of claim 1, further comprising a second energy input connection coupled to a second input of the energy supply interface module, which connection is configured to be connected to an external energy supply.

5. The interface architecture of claim 1, further comprising a second energy output connection coupled to a second output of the energy supply interface module, which connection is configured to deliver electrical energy to a load that can be connected to the second energy output connection.

6. The interface architecture of claim 1, wherein the data interface module has a wireless communication interface.

7. The interface architecture of claim 1, further having at least one of a display and a user interaction module which is coupled to the data interface module.

8. The interface architecture of claim 7, wherein the data interface module is configured to control data communication via power lines of the energy supply interface module.

9. A cabin monument having an interface architecture comprising:
an energy supply interface module;
a data interface module;
a first energy input connection coupled to a first input of the energy supply interface module, which connection is configured to be connected to an external energy supply;
a first data input connection coupled to the data interface module, which connection is configured to obtain data from an external data source and forward the data to the data interface module;
a first energy output connection coupled to a first output of the energy supply interface module, which connection is configured to deliver electrical energy to a load that can be connected to the first energy output connection;
a communication interface, which couples the energy supply interface module to the data interface module; and
a circuit module, which is separate from the energy supply interface module and coupled between the first output of the energy supply interface module and the first energy output connection.

10. An aircraft having a cabin monument having an interface architecture comprising:
an energy supply interface module;
a data interface module;
a first energy input connection coupled to a first input of the energy supply interface module, which connection is configured to be connected to an external energy supply;
a first data input connection coupled to the data interface module, which connection is configured to obtain data from an external data source and forward the data to the data interface module;
a first energy output connection coupled to a first output of the energy supply interface module, which connection is configured to deliver electrical energy to a load that can be connected to the first energy output connection; and
a communication interface, which couples the energy supply interface module to the data interface module; and
a circuit module, which is separate from the energy supply interface module and coupled between the first output of the energy supply interface module and the first energy output connection.

11. A method for linking a cabin monument in an aircraft, comprising:
connecting an external energy supply to a first energy input connection that is coupled to a first input of an energy supply interface module of an interface architecture;

connecting an external data source to a first data input connection that is coupled to a data interface module of the interface architecture;

connecting an electrical load to a first energy output connection of the interface architecture, which connection is coupled to a first output of the energy supply interface module; and coupling the energy supply interface module to the data interface module via a communication interface of the interface architecture;

wherein the interface architecture further comprises a circuit module, which is separate from the energy supply interface module and coupled between the first output of the enemy supply interface module and the first energy output connection.

* * * * *